United States Patent Office 2,764,801
Patented Oct. 2, 1956

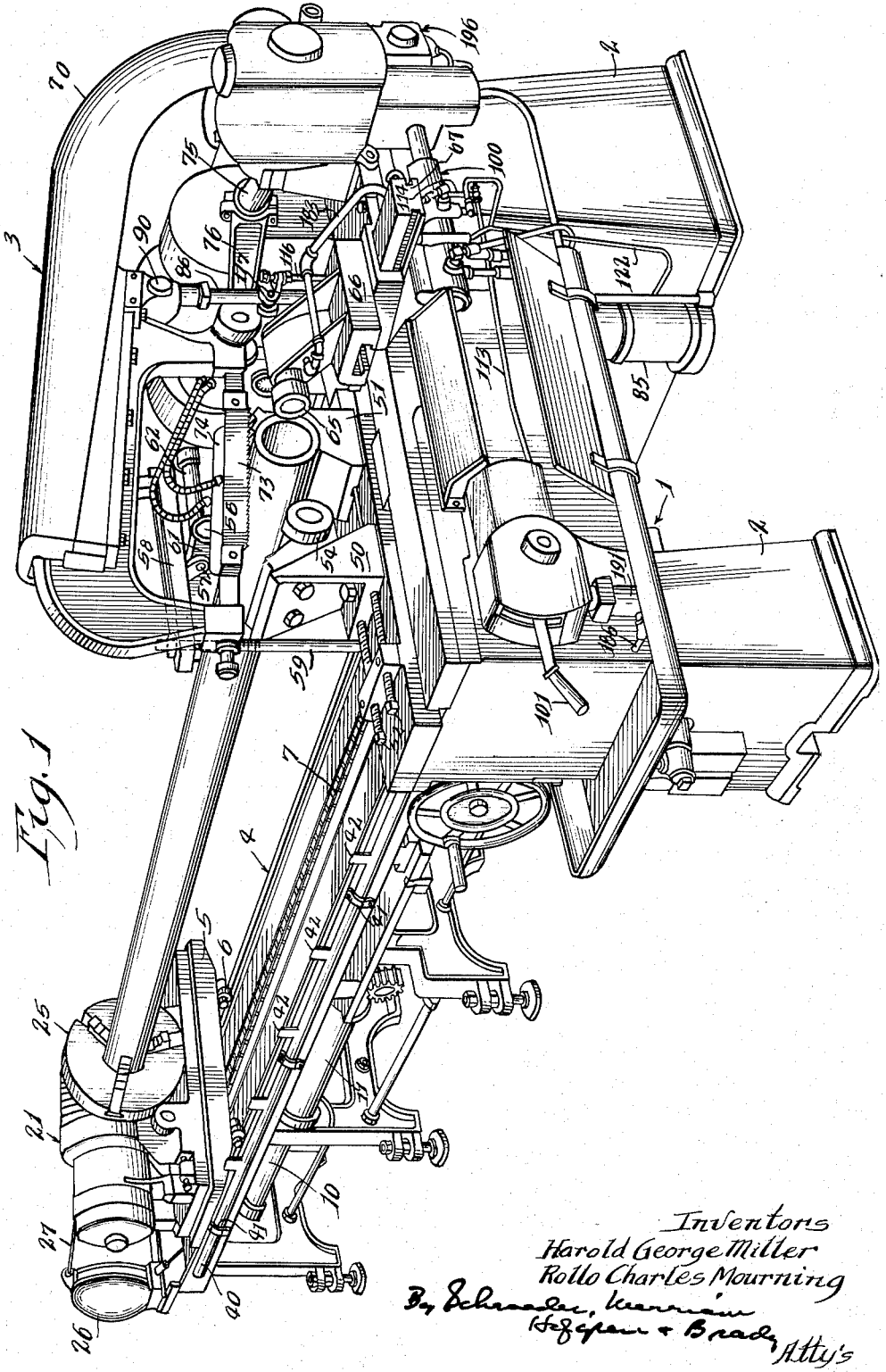

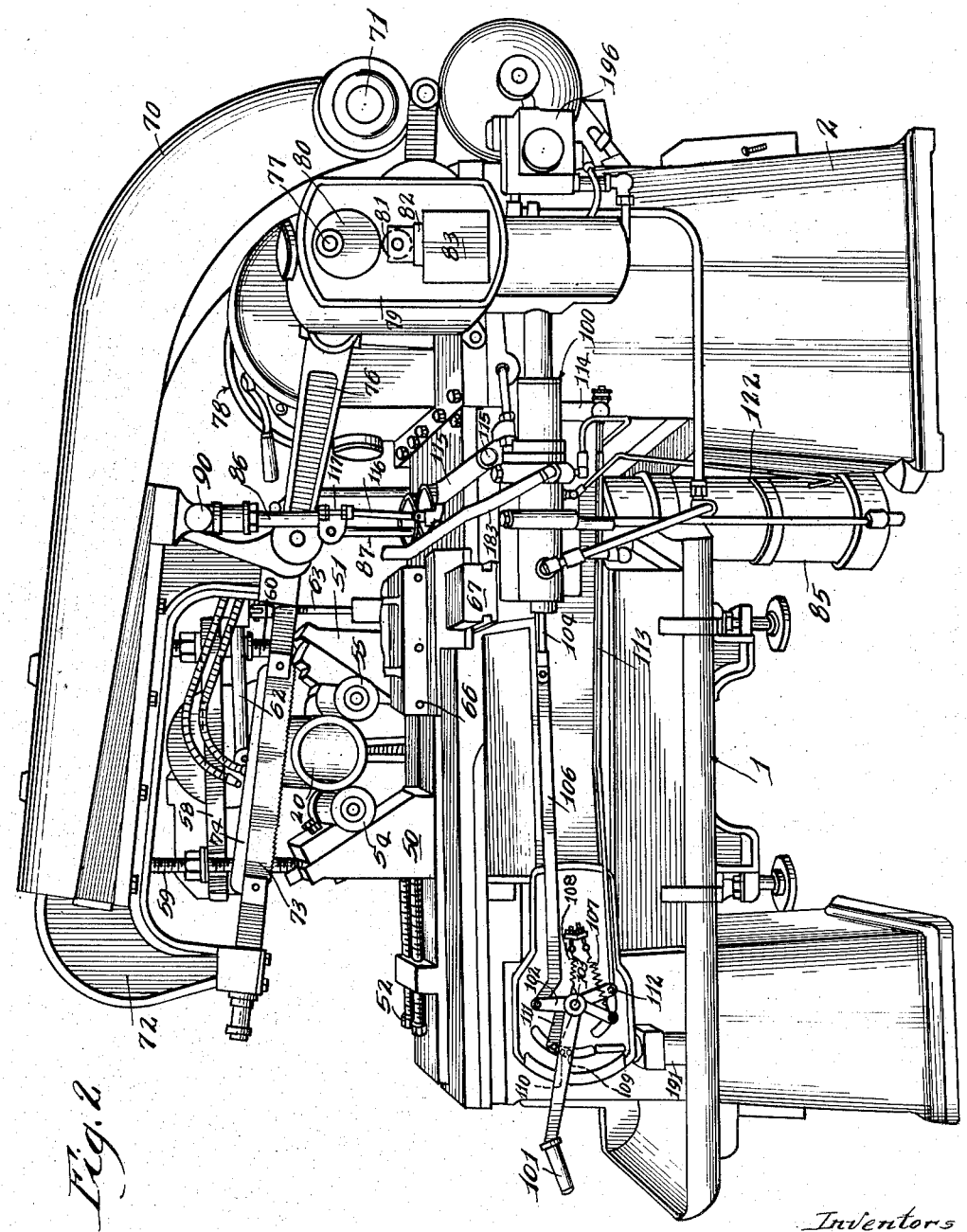

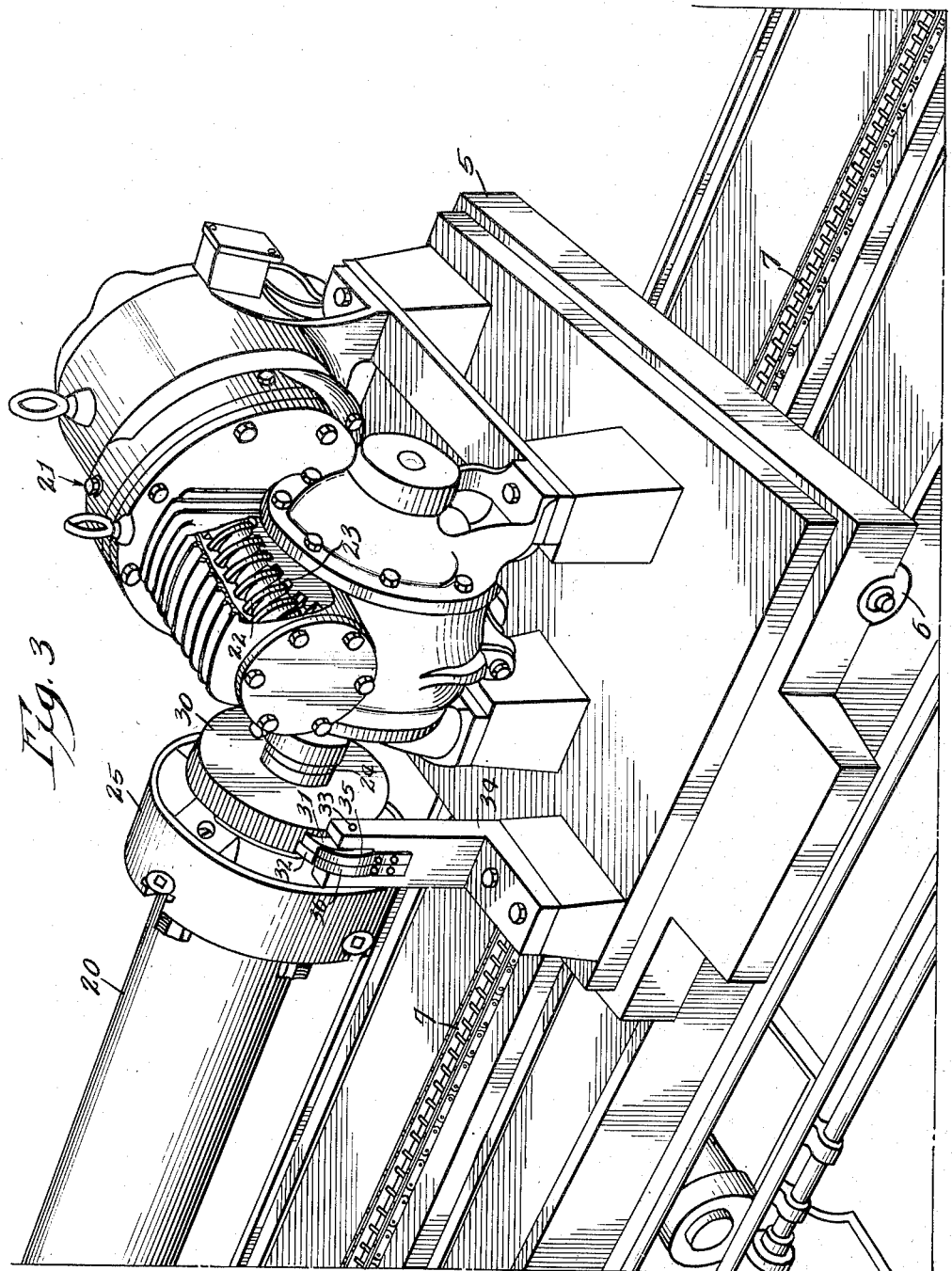

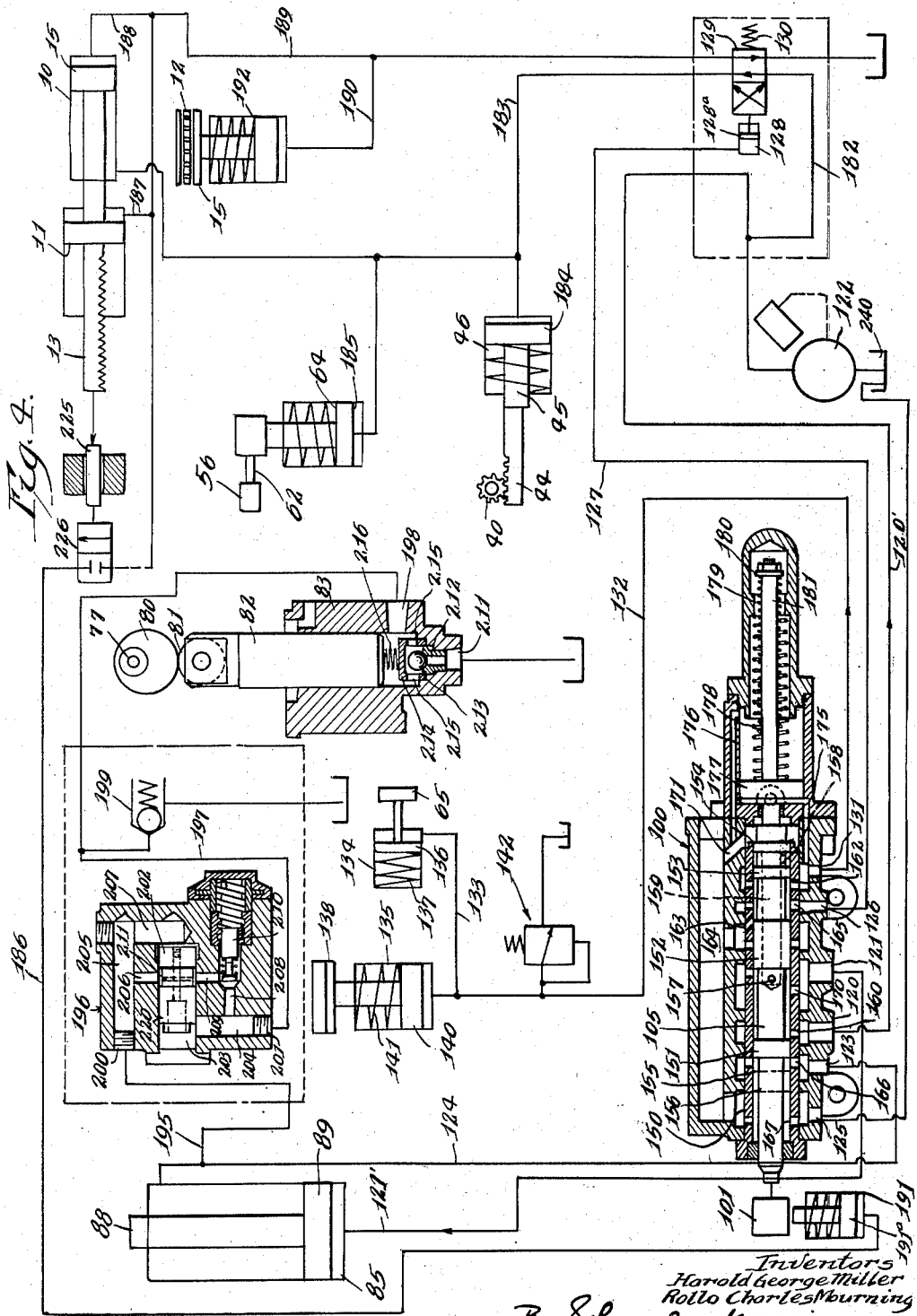

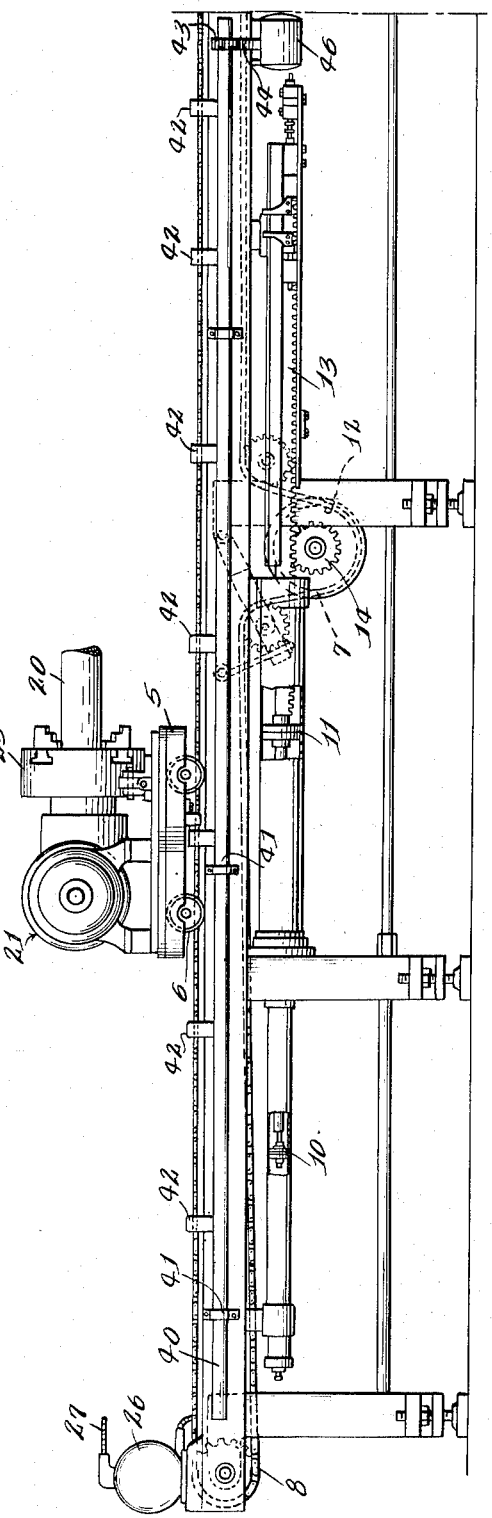

2,764,801

ROTARY PIPE CUTTER

Harold George Miller and Rollo Charles Mourning, Racine, Wis., assignors to Racine Hydraulics and Machinery, Inc., a corporation of Wisconsin Application September 29, 1953, Serial No. 382,964

4 Claims. (Cl. 29—73)

This invention relates to a new and improved pipe cutter and more particularly a pipe cutter for cutting a continuously rotating pipe.

An object of the invention is to provide a pipe cutter which cuts predetermined lengths of pipe by means of one or more reciprocating hacksaw blades which are fed toward the pipe in increments totaling the thickness of the pipe wall.

Another object of the invention is to provide a hacksaw blade pipe cutter having a table on which is mounted a movable carriage supporting a rotating chuck for engaging one end of the pipe and advancing the rotating pipe to a work support mounted at the cutting station comprising a pair of inclined laterally spaced brackets each having a work engaging roller for rotatably engaging opposite sides of the work below the center line thereof and rotatably supporting the pipe.

Another object of the invention is to provide a pipe cutter as described in the preceding paragraph wherein a movable stop gauge is positioned in front of the work support to positively position the work in cutting position and wherein a pivotally mounted roller is positioned for engagement with the top of the pipe at the cutting station for holding the pipe against the supporting rollers while rotating therewith.

Another object of the invention is to provide a mechanism for rotating a pipe in a pipe cutter having a reciprocating hacksaw blade wherein gear means continuously rotate the work supporting chuck holding one end of the pipe and pawl and ratchet means are provided to prevent reverse rotation in the gear means upon each cutting stroke of the hacksaw blade.

Another object of the invention is to provide a new and improved circuit for controlling the raising and lowering movement of the hacksaw blade during a single cutting cycle including a plurality of cutting strokes of the saw.

Another object of the invention is to provide a circuit as described in the preceding paragraph wherein means are provided for advancing the hacksaw blade into the work upon each cutting stroke thereof, for relieving the blade a certain distance upon the return stroke of the blade and for then returning the blade to its previous cutting position and in addition advancing the blade to a new cutting depth in the pipe comprising a reciprocating plunger type pump operated by the main drive shaft of the machine and a valve connected between the pump and the cylinder for controlling the feed movement of the blade.

The objects of the invention generally set forth, together with other ancillary advantages, are attained by the construction and arrangement shown by way of illustration in the accompanying drawing, in which:

Fig. 1 is a side perspective view in elevation of the new and improved rotary pipe cutter;

Fig. 2 is an end perspective view in elevation of the new rotary pipe cutter with the stop gauge broken away and panels on a pair of housings removed;

Fig. 3 is a perspective view of the pipe supporting carriage and the mechanism carried thereon;

Fig. 4 is a diagrammatic view having parts in section of the hydraulic circuit for controlling the machine;

Fig. 5 is a side view in elevation of the table associated with the pipe cutter having the pipe supporting carriage mounted thereon;

Fig. 6 is a view in section of one of the pistons shown in Fig. 5; and

Fig. 7 is a view in section of another piston shown in Fig. 5.

While this invention is susceptible of embodiment in many different forms, there is shown in the drawings and will herein be described in detail an illustrative embodiment of the invention with the understanding that the present disclosure is to be considered as an exemplification of the principles of the invention and is not intended to limit the invention to the embodiment illustrated. The scope of the invention will be pointed out in the appended claims.

The machine, as shown in the drawings, comprises a base 1, having legs 2, which supports the pipe cutting mechanism, indicated generally at 3, and the work support for supporting and holding the pipe during the cutting thereof. A table indicated generally at 4 is connected to the base 1 and has a carriage 5 provided with rollers 6 mounted for movement thereon.

The carriage 5 is moved along the table toward the cutting station by a chain 7 which passes around pulleys 8 at opposite ends of the table and which has its ends connected to the carriage. The chain 7 is driven by a pair of interconnected piston and cylinder devices 10 and 11 which drive a sprocket 12 about which the chain passes by means of the rack 13. The rack 13 engages with gear 14. The gear 14 is connected to a hydraulically operated clutch mechanism 15, shown diagrammatically in Fig. 4, the arrangement being such that the entry of fluid under pressure to the left of the pistons 10 and 11, as shown in Fig. 5, will shift the rack 13 to drive the gear 14 which through the clutch 15 will drive the sprocket 12. Entry of fluid under pressure to the right of the piston 10 as shown in Fig. 5 will return the rack 13 to its initial position.

The piston and cylinder device 10 is shown in more detail in Fig. 6 and comprises a central member 15 secured to a piston rod 16 and having oil seal members 17. The piston rod 16 is pinned to the piston 11a in piston and cylinder device 11 by a pin 16a and an oil seal member 18 abuts against the piston 11a. The piston 11a has a rack 13 secured thereto. Means are provided for rotating the pipe comprising an electric motor and gear reduction unit, indicated generally at 21, having a worm 22 for driving the worm wheel 23 which is keyed to a shaft 24 having a work holding chuck 25 attached thereto. A reel 26 is connected to the table and has a spring tensioned reel therein which supports an electric cable 27 extending to the motor unit 21. Also secured to the motor driven shaft 24 is a ratchet wheel 30 which is engaged by a pair of pawls 31 and 32 pivotally mounted by a pin 33 to bracket 34 upstanding from the base of the carriage 5. The pawls 31 and 32 are urged into engagement with the ratchet wheel 30 by a pair of springs 35 and 36, respectively. The ratchet wheel engaging ends of these pawls are spaced apart from each other along the periphery of the ratchet wheel a distance equal to one-half of the distance between a pair of ratchet teeth for a purpose that will be more fully set forth hereinafter.

Mechanism is provided for holding the carriage 5 in fixed position during cutting of the pipe comprising a shaft 40 pivotally mounted by means of brackets 41 to one side of the table and having a plurality of lugs 42 provided with curved ends spaced apart from each other a distance less than the length of the carriage for engagement with the carriage upon rotation of the shaft 40. The shaft 40 has a series of teeth 43 at one end thereof which are engaged by a rack 44 connected to a piston rod 45 in a cylinder 46 which is in the hydraulic circuit shown in Fig. 4.

At the cutting station on the base 1, a pair of inclined brackets 50 and 51 are adjustably mounted on the base by screws 52 for adjusting the brackets for different widths of pipe. The screws 52 are associated with the bracket 51 not being shown but being similar to those shown in connection with the bracket 50. The brackets 50 and 51 have rollers 54 and 55 respectively, mounted thereon which are positioned for engagement with opposite sides of the pipe below the center line thereof for rotatably supporting the pipe during the cutting thereof.

A hold down roller 56 which engages and rolls with the pipe and holds it against the rollers 54 and 55 is mounted on an arm 61 which is pivotally secured at 57 to a bar 58 which is supported from the base by upstanding shafts 59 and 60. The roller supporting arm 61 is connected to a shaft 62 which is rotated by an extension 63 of the piston rod in cylinder 64.

A stop gauge mechanism having a roller 65 and a support 66 therefor is slidably adjustable on an extension 67 of the base 1 for adjusting the distance of the roller 65 with respect to the hacksaw blades 73 and 74. This stop gauge is hydraulically controlled, as shown in Fig. 4, so that it is in position to stop the pipe during the forward feeding movement thereof but is out of engagement with the pipe during the cutting thereof.

The cutting mechanism, indicated generally at 3, comprises a saw guide 70 pivotally mounted to the base 1 on shaft 71. An arbor 72 which supports the pair of blades 73 and 74 is slidably mounted in the saw guide 70. The arbor 72 is reciprocated by a crank 75 which is pivotally connected to the arbor by a connecting link 76. The crank is mounted on a drive shaft 77 which extends from a gear reduction and clutch unit, indicated generally at 78, and into a housing 79. The drive shaft 77 has a cam 80 fixedly mounted thereon for rotation therewith which engages a follower 81 which is mounted on the piston 82 of a reciprocating plunger type pump 83.

The raising and lowering movement of the saw guide 70 for moving the blades 73 and 74 toward and from the pipe 20 is effected by a mechanism including a cylinder 85 which has a pair of upwardly extending bars 86 and 87 connected to the piston rod 88 of piston 89 (Fig. 4). The bars 86 and 87 are pivotally connected to the saw guide 70 by means, such as pivots 90.

The operation of the machine is controlled by a main valve, indicated generally at 100, and shown in Figs. 1, 2 and 4 which may be manually operated by a handle 101 having an arm 102 secured thereto for movement about shaft 103 and connected to an extension 104 of the valve member 105 (Fig. 4) by a link 106. The valve member 105 may be shifted into three different positions by the handle 101. The lowest position of the handle causes the carriage to advance the pipe prior to cutting thereof and movement of the stop gauge roller 65 to pipe engaging position. The intermediate position of the handle 101 causes downward movement of the saw guide 70 to cause cutting of the pipe 20 by the blades 73 and 74 as well as holding of the pipe by roller 56, clamping of the carriage by shaft 40 and reciprocation of the blades 73 and 74. The top position of the handle 101 causes elevation of the saw guide 70 to raise the hack saw blades 73 and 74 out of engagement with the pipe 20, disconnection of the clutch for reciprocating the blades 73, 74, release of the carriage by shaft 40 and release of the pipe by hold down roller 56.

The handle 101 is biased to its lowest position by a pair of springs 107 and 108 which balance the handle in that position.

The handle 101 has a detent 109 which engages beneath a retractable detent 110 on the frame in the intermediate position of the handle and they are held in engagement by means of a spring in valve 100 acting through link 106 as more fully described hereinafter. The handle 101 is held in its uppermost position by the same detents and in this position the detent 109 on the handle 101 is located above the detent 110 on the frame. The retractable detent 110 is pushed to retracted position by a bell crank comprising arms 111 and 112 which are pivotally mounted on shaft 103. The arm 112 having a rod 113 secured thereto which is connected to a bell crank having arms 114 and 115 pivoted to the base at 115'. The arm 115 has a link 116 pivotally mounted thereon and connected to a bracket 117 mounted on the saw guide elevating bar 86. The connection of the rod 116 to the bracket 117 is adjustable. Thus, through the above described linkage the saw guide 70 will cause movement of the arms 111 and 112 about the shaft 103 to cause retraction of the retractable detent 110 as more fully set forth hereinafter.

The hydraulic circuit for controlling the machine is shown in Fig. 4 and includes the valve 100 which has a port 120 connected by a line 120' to a pump 122 which is connected to a tank 240. The valve 100 has a port 121 connected to the bottom of the saw guide lift cylinder 85 by a line 121' and has a port 123 connected by a line 124 to the top of the lift cylinder 85. A port 125 connects the valve 100 to the tank 240 and the port 126 is connected by a line 127 to a piston and cylinder device 128 having a piston 128a for shifting a four-way valve shown diagrammatically at 129 against the action of a spring 130.

The port 131 in the valve 100 is connected by lines 132 and 133 to the cylinder 134 mounted in the housing 66 of the stop gauge mechanism and to a cylinder 135 which operates a clutch provided in the gear reduction and clutch unit 78. The operation being such that when port 131 is connected to pump pressure the fluid passing through line 133 shifts the piston 136 to the left against the action of spring 137 to withdraw the stop gauge roller 65 out of engagement with the pipe 20 and also to shift the piston 140 and piston rod 141 in cylinder 135 outwardly to engage the clutch 138 for driving the saw arbor 72. A pressure relief mechanism comprising a conventional pressure relief valve is indicated generally at 142 and is connected in the line 132.

The valve 100 has a sleeve 150 in the casing having a valve member 105 mounted therein. The valve member 105 has spools 151, 152, 153 and 154 and the valve member has three positions as controlled by the handle 101. The first position of the valve is as shown in Fig. 4 which corresponds to the uppermost position of the handle 101. The second position of the valve member 105 is indicated by the dotted line 155 showing the center line of spool 151 which corresponds to the intermediate position of the handle 101. The third position of the valve member is indicated by the dotted line showing 156 of the center line of spool 151 which corresponds to the lowest position of the handle 101. The valve member is provided with openings 157 and 158 which are connected by a hollow passage 159 in the body of the valve member.

In the position of the valve member, as shown in Fig. 4, fluid will pass through line 120' from the pump 122 into port 120 and through opening 160 in the sleeve 150. This oil will pass through port 170 in the sleeve 150, port 121 and line 121' to the under side of the lift cylinder 85. The other lines leading from the valve 100 will be connected to drain port 125. The line 132 being connected to port 131 communicating with openings 162, 163 and in the sleeve 150 and into a drain chamber 164 which communicates with the drain port 125. The line 127 connected to port 126 of valve 100 communicates with openings 165 and 163 in the sleeve. The line 124 to the top of the lift cylinder 85 connects with port 123 in the valve 100 and through the opening 166 and opening 167 in the sleeve 150 to connect with the drain port 125.

When the valve member 106 is shifted to its intermediate position to cause downward movement of the saw guide 70 and cutting of the pipe 20, the oil entering from pump 122 passes through port 120 and opening 160. Opening 166 is blocked by the spool 151 and thus oil is prevented from passing through opening 166 which connects with the port 123 connected to the top of the lift cylinder 85. The oil will pass through an opening 170 in the sleeve 150 and port 121 in the valve which communicates with the bottom of the lift cylinder 85. Oil under pressure will pass through the hollow passage 159 in the valve member 105 and out through opening 158 in the valve member, opening 162 and port 131 to the stop gauge cylinder 134 and the saw clutch cylinder 135. Port 126 which communicates with the cylinder 128 for the four-way valve 129 is connected to drain through openings 165 and 163 in the sleeve 150.

The third position of the valve member 105, as shown by the dotted centerline position 156 of the spool 151, causes the carriage to be advanced for feeding of the pipe to the cutting station. In this position the line 121' connected to the bottom of the lift cylinder 85 has its port 121 and opening 170 in the sleeve 150 blocked by the spool 152 to prevent oil passing from the bottom of the lift cylinder and to hold the saw guide in up position. The line 132 connected to the stop gauge mechanism 65 and saw clutch 138 is connected to drain through port 131, opening 162 in the sleeve 150 and an opening 171 in the casing of the valve. The line 124 connected to the top of the lift cylinder 85 and its port 123 is connected to inlet port 120 by openings 160 and 166 in the sleeve 150. The cylinder 128 for the four-way valve 129 is connected to the inlet port 120 through line 127, port 126, the openings 157 and 158 and hollow passage 159 in the valve member 105 and by openings 160 and 165 in the sleeve 150.

For a purpose more fully set forth hereinafter a passage 175 is provided in the casing of the valve 100 communicating with a chamber 176 having a piston 177 urged to the left, as shown in Fig. 4, by a spring 178. Thus, when the saw clutch 138 and stop gauge mechanism 65 are connected to fluid under pressure by the line 132 fluid also flows through passage 175 to urge the piston 177 to the right, as shown in Fig. 4, which compresses a second spring 179 surrounding an extension 181 of the valve member 105 and in engagement with a nut 180 on the end thereof which tends to shift the valve member 105 to the right. The piston 177 is slidable on the extension 181.

A line 182 is connected to the pump 122 and connects with an inlet port of the conventional four-way valve 129. In one position of this valve, oil passes through a line 183 to the cylinder 46 having a piston 184 to cause rotation of the carriage locking shaft 40 and to the cylinder 64 having the piston 185 to cause the hold down roller 56 to firmly engage and hold the rotating pipe 20 against the pipe supporting rollers 54 and 55. Oil also passes into the left hand end of cylinder 10, as shown in Fig. 4, to cause movement of the piston 15 to withdraw the rack 13. A plurality of lines 186, 187, 188, 189 and 190, in the same position of the four-way valve 129, connect the cylinder 191, the right hand ends of cylinders 10 and 11 and the bottom of cylinder 192 through the four-way valve 129 to tank. When the four-way valve 129 is shifted by the hydraulic cylinder 128 the lines 186, 187, 188, 189 and 190 are connected to the pressure line 182 for causing movement of the pistons in their respective cylinders. The line 183 connected to the cylinders for the hold down roller 56 and carriage lock shaft 40 are then connected to the tank.

It is necessary in cutting a pipe by a reciprocating hack saw blade to have a plurality of cutting strokes. After each stroke it is desirable to relieve the blade for free return thereof. The blade is returned to the position it was in before being relieved and then advanced into the work an additional increment for the next cut. We have provided novel hydraulic circuit mechanism for accomplishing this function under the control of the main drive shaft 77 of the machine.

During the cutting operation, oil under pressure is directed to the underside of the lift cylinder 85 by the line 121' which, of course, tends to raise the saw guide 70 to relieve the hacksaw blades and oil is intermittently supplied to the top of the lift cylinder 85 through a line 195 which is connected to a valve unit, indicated generally at 196. A line 197 connects the valve 196 to an outlet 198 of the reciprocating piston type pump 83 which is operated by the previously described cam 80 mounted on the shaft 77 for rotation therewith. A safety relief valve 199 is connected in the line 197.

The valve 196 has a port 200 connected to the line 195 and a port 201 connected to the line 197. A valve member 202 is slidably mounted in a bore 203 in the valve 196 one end of which serves to store oil evacuated from the lift cylinder 85. The bore 203 communicates with a passage 204 terminating in the port 201. The port 200 connects with passages 205, 206 and 207 in the valve and there are also passages 208 and 209 which connect the port 201 and the bore 203 through a conventional throttle valve 210. The valve member 202 has a central portion thereof of a smaller diameter provided with a tubular passage 211 therethrough which in one extreme position of the valve member connects the passages 206 and 209. In the other extreme position of the valve member 202 the passages 206 and 209 are blocked.

The reciprocating plunger type pump 83 has an inlet 211 connected to tank and a passage 212 over which is placed a housing 214 having openings 215 and having a check ball 213 therein which prevents oil escaping to tank from the pump. Supported on top of the housing 214 is a spring 216 which urges the plunger 82 and its follower roller 81 into engagement with the cam 80 on main drive shaft 77.

The operation of this circuit is as follows:

With pressure coming through line 122 to the bottom of the lift cylinder 85 through valve 100, the rotation of the drive shaft 77 causes oil in the pump 83 beneath the piston 82 to be driven out through port 198 and through line 197 to the port 201 of the valve 196. The oil then passes through port 201 into the bore 203 and engages a shoulder 220 on the valve 202 to shift the valve to the right, as shown in Fig. 4. Oil also passes through passage 208 and through the throttle valve 210 and passage 209 to the bore 203. The hollow passage 211 in the valve member 202 is then in communication with the passage 209 and the passage 206 so that the oil may pass out of the valve through port 200 and to the top of the lift cylinder 85. The oil entering the top of the lift cylinder is at a pressure two to three times greater than the pressure of the oil in the bottom of the lift cylinder so that the piston 89 in the lift cylinder will be moved downwardly and cause downward movement of the saw guide 70.

Continued rotation of the drive shaft 77 will rotate the cam 80 and permit upward movement of the piston 82 by spring 216 which will take the pressure off of line 197. This will cause oil to be forced out from the top of the lift cylinder 85 through the line 195 because of pressure on the underside of the lift piston 89 which relieves the hacksaw blades 73 and 74. This oil passes into port 200 and passage 207 in valve 196. The valve member 202 will shift to the left to move the hollow passage 211 therein out of communication with passages 206 and 209. The shifting of the valve member 202 permits the storage of a predetermined amount of oil in the right hand end of bore 203, as shown in Fig. 4. The lifting of the piston 82 in the pump 83 will draw oil from tank by suction through port 211 and passage 212. Thus, when the drive shaft 77 rotates to a position to cause cam 80 to again lower the piston 82, oil under pressure will be passed through line 197 into the bore 203 to engage the shoulder 220 on the valve member 202 and shift it to the right. This will force the oil stored in the right hand end of the bore 203, as shown in Fig. 4, into the top of the lift cylinder 85 which will return the saw guide 70 to its previous position, because the same amount of oil is returned to the lift cylinder as was taken therefrom. The new increment of oil driven out of the pump 83 by the piston 82 will pass through the throttle valve 210 and through the hollow passage 211 in the valve member 202 and out through line 195 to lower the saw guide 70 an additional increment.

It is believed that the function of the ratchet wheel 30 carried on the chuck driving shaft 24 and pawls 31 and 32 on the carriage 5 will now be apparent. Inasmuch as the hacksaw blades make a plurality of cutting strokes in one cutting operation or cycle, it is desirable to prevent slight reverse rotation of the pipe 20 because of backlash in the gears 22 and 23 each time that the hacksaw blades dig in for a cutting stroke. The pawls 31 and 32 are of a slightly different length and their ratchet engaging ends are spaced apart half the distance between a pair of ratchet teeth. This permits the use of fewer and stronger teeth on the ratchet wheel 30 since the ratchet wheel may only rotate in a reverse direction a distance equal to one-half the distance between adjacent ratchet teeth before it is engaged by one of the two pawls 31 and 32.

With the saw guide 70 in its highest position the handle 101 will be in its lowest position and held there by the balancing springs 107 and 108. In this position of the handle, the valve 100 will be in its extreme left position, as indicated by the dotted line position 156 of the spool 151. This will cause the saw guide 70 to be held in its elevated position and the stop gauge roller 65 to be projected in front of the pipe 20. At this time, the reciprocating saw clutch 138 is disengaged and the carriage locking shaft 40 and hold down roller 56 in their non-engaging positions. The four-way valve 129 is shifted by cylinder 128 to cause fluid under pressure to flow to the right hand ends of cylinders 10 and 11, as shown in Fig. 4, to drive the rack 13 and also to cause engagement of the feed clutch 15 for moving the carriage 5 along the table 4.

When the rack 13 reaches the ends of its movement it hits a mechanical plunger 225 which shifts a two-way valve 226 to permit fluid under pressure to pass to the cylinder 191 through the line 186. The cylinder 191 has a piston 191a having a piston rod which engages handle 101 and causes upward movement of the handle to a position where the detent 109 on the handle comes into engagement with the retractable detent 110 on the base.

This movement of the handle 101 shifts the valve member 105 to its intermediate position and the handle and valve member are held in this position by movement of the piston 177 to the right which compresses the spring 179, this movement occurring by means of oil under pressure passing through the passage 175. In this position of the valve member 105, oil under pressure passes to the under side of lift cylinder 85 and passes to the stop gauge cylinder 134 to retract the stop gauge and to the saw clutch cylinder 135 to engage the clutch to reciprocate the saw. The cylinder 128 for shifting the four-way valve 129 is connected to tank and the four-way valve shifts so that oil under pressure passes through line 183 to cylinder 10 to retract the rack 13. The line 124 connected to the top of the lift cylinder 185 is blocked in the valve 100 and the aforementioned valve 196 and piston type pump 83 cause the blades 73 and 74 to move through a cutting cycle as previously described.

As the saw guide 70 reaches its downward limit of movement the link 116 connected to one of the lift rods 86 for the saw guide 70 causes pivoting of the bell crank having the arms 114 and 115 about the pivot 115' to shift the rod 113. This operates the arm 111 for retracting the retractable detent 110 which permits the handle 101 to move to its top position by means of the force stored in the spring 179 surrounding the extension 181 of the valve member 105 which has been under compression. The arm handle 101 is held in its top position by the retractable detent 110 being in engagement with the detent 109 on the handle 101.

In this position of the handle 101, oil is directed to the under side of lift cylinder 85 and the top of the lift cylinder is connected through the valve 100 to tank. The stop gauge cylinder 134 and saw clutch cylinder 135 are connected through line 132 to tank which causes the stop gauge roller 65 to move out to a position to engage the pipe and the saw clutch 138 is disengaged under control of spring 141. The cylinder 128 controlling the four-way valve 129 is connected to drain through line 127 as it was in the previous position of valve 100. When the saw guide 70 reaches its uppermost position, the rod 113 is again actuated by the link 116 and the arms 115 and 114 to retract the retractable detent 110 and permit the handle 101 to shift to its lowest position wherein it is held by the balancing springs 107 and 108. In this position, the forward feeding movement of the carriage 5 commences.

We claim:

1. A rotating pipe cutting mechanism comprising, a table, a base having a cutting station and a pair of reciprocating hacksaw blades at the cutting station mounted for downward feed movement to cut through the thickness of the pipe wall as they are reciprocated, a pipe feed carriage mounted on the table for step-by-step movement to advance successive lengths of pipe to the cutting station, means for locking the carriage against movement after the advance of the pipe, a pipe support at the cutting station comprising a pair of spaced adjustable inclined brackets having rollers thereon for engaging the sides of the pipe below the center-line thereof and rotatably supporting said pipe, a pipe hold-down means disposed at the cutting station and positioned above and between said spaced inclined supports for holding the pipe against said rollers, said hold-down means comprising a pivoted arm extending parallel to the pipe and having a roller on its end positioned for engagement and rotation with the pipe, a stop gauge roller at the cutting station positioned in front of the leading end of the pipe for determining the cutting position of the pipe, means for positioning said gauge roller in front of the pipe during advance of the pipe to cutting position and for retracting the gauge roller during cutting of the pipe, and means on the pipe feed carriage for continuously rotating said pipe, the last-named means including a rotatable chuck for holding an end of the pipe, a motor and gear means for rotating the chuck and means for preventing reverse rotation in said gear means upon each cutting stroke of the hacksaw blades including a ratchet wheel rotatable with the chuck and a pair of spring-urged pawls positioned for locking engagement with said ratchet teeth to prevent reverse rotation of said pipe as said hacksaw blade moves through its cutting stroke, said pawls being of a different length so as to have their ratchet wheel engaging ends spaced apart a distance equal to one half the distance between a pair of adjacent ratchet wheel teeth to hold the ratchet wheel against a backward rotation of more than one half the distance between said two teeth.

2. A rotating pipe cutting mechanism comprising, a table, a base having a cutting station and a reciprocating hacksaw blade at the cutting station mounted for downward feed movement to cut through the thickness of the pipe wall as it is reciprocated, a pipe feed carriage mounted on the table for step-by-step movement to advance successive lengths of pipe to the cutting station, a pipe support at the cutting station comprising a pair of spaced adjustable inclined supports having rollers thereon for engaging sides of the pipe below the centerline thereof and rotatably supporting said pipe, a pipe hold-down means disposed at the cutting station and positioned above and between said spaced inclined supports for holding the pipe against said rollers, said hold-down means comprising a pivoted arm extending parallel to the pipe and having a roller on its end positioned for rotation with the pipe, a stop gauge roller at the cutting station positioned in front of the leading end of the pipe for determining the cutting position of the pipe, means for raising said hold-down roller and for positioning said gauge roller in front of the pipe during advance of the pipe to cutting position and for lowering said hold-down roller and for retracting the gauge roller during cutting of the pipe, and means on the pipe feed carriage for continuously rotating said pipe, the last-named means including a rotatable chuck for holding an end of the pipe, a motor and drive means for rotating the chuck and means for preventing reverse rotation in said drive means upon each cutting stroke of the hacksaw blade including a ratchet wheel rotatable with the chuck and pawl means positioned for locking engagement with said ratchet teeth to prevent reverse rotation of said pipe as said hacksaw blade moves through its cutting stroke.

3. A rotating pipe cutting mechanism comprising, a table, a base having a cutting station and a reciprocating hacksaw blade at the cutting station mounted for downward feed movement to cut through the thickness of the pipe wall as it is reciprocated, a pipe feed carriage mounted on the guideway for step-by-step movement to advance successive lengths of pipe to the cutting station, a pipe support at the cutting station comprising a pair of rollers for engaging the sides of the pipe below the centerline thereof and rotatably supporting said pipe, a pipe hold-down means disposed at the cutting station and positioned above said pipe for holding the pipe against said rollers, said hold-down means comprising a pivoted arm extending parallel to the pipe and having a roller on its end position for engagement and rotation with the pipe, means for raising said hold-down roller during advance of the pipe to cutting position and for lowering said hold-down roller during cutting of the pipe, and means on the pipe feed carriage for continuously rotating said pipe, the last-named means including a rotatable chuck for holding an end of the pipe, a motor and gear means for rotating the chuck and means for preventing reverse rotation in said gear means upon each cutting stroke of the hacksaw blade.

4. A rotating pipe cutting mechanism comprising, a table, a base having a cutting station and a reciprocating hack-saw blade at the cutting station mounted for downward feed movement to cut through the thickness of the pipe wall as the blade is reciprocated, a pipe feed carriage mounted on the table for step-by-step movement to advance successive lengths of pipe to the cutting station, a pipe support at the cutting station including a pair of rollers for engaging the sides of the pipe below the center line thereof and rotatably supporting said pipe, a pipe hold-down roller disposed at the cutting station and positioned above the pipe for holding the pipe against said supporting rollers, means mounting the hold-down roller for movement to and from a position engaging the pipe for rotation therewith, a stop-gauge roller at the cutting station positioned in front of the leading end of the pipe for determining the cutting position of the pipe, and means for automatically raising said hold-down roller and for positioning said gauge roller in front of the pipe during advance of the pipe to cutting position and for automatically lowering said hold-down roller and for retracting the gauge roller during cutting of the pipe.

References Cited in the file of this patent
UNITED STATES PATENTS

| | | |
|---|---|---|
| 769,265 | Liebert | Sept. 6, 1904 |
| 1,290,507 | Carroll | Jan. 7, 1919 |
| 2,144,335 | Jensen et al. | Jan. 17, 1939 |
| 2,182,289 | Eisenlohr | Dec. 5, 1939 |
| 2,363,760 | Waldie | Nov. 28, 1944 |
| 2,600,787 | Lodwick | June 17, 1952 |